US012080259B2

(12) United States Patent
Powers

(10) Patent No.: US 12,080,259 B2
(45) Date of Patent: Sep. 3, 2024

(54) VIBRATO MECHANISM

(71) Applicant: TAYLOR-LISTUG, INC., El Cajon, CA (US)

(72) Inventor: Andrew Taylor Powers, Carlsbad, CA (US)

(73) Assignee: Taylor-Listug, Inc., El Cajon, CA (US)

( * ) Notice: Subject to any disclaimer, the term of this patent is extended or adjusted under 35 U.S.C. 154(b) by 179 days.

(21) Appl. No.: 17/649,729

(22) Filed: Feb. 2, 2022

(65) Prior Publication Data

US 2023/0245634 A1 Aug. 3, 2023

(51) Int. Cl.
*G10D 3/153* (2020.01)

(52) U.S. Cl.
CPC .................................... *G10D 3/153* (2020.02)

(58) Field of Classification Search
CPC ................................ G10D 3/153; G10D 3/00
See application file for complete search history.

(56) References Cited

U.S. PATENT DOCUMENTS

| | | | | |
|---|---|---|---|---|
| D169,120 S | | 3/1953 | Bigsby | |
| D170,109 S | | 8/1953 | Bigsby | |
| 2,949,806 A | | 8/1960 | Turman | |
| 3,248,991 A | | 5/1966 | Cole | |
| 4,648,304 A | * | 3/1987 | Hoshino | G10D 3/153 84/297 S |
| 4,882,967 A | * | 11/1989 | Rose | G10D 3/153 84/313 |
| 9,076,412 B1 | | 7/2015 | Rolling | |
| 9,653,055 B1 | | 5/2017 | Savage et al. | |
| 2008/0229898 A1 | | 9/2008 | Steinberger | |
| 2016/0232881 A1 | | 8/2016 | Alday | |

FOREIGN PATENT DOCUMENTS

GB 1199679 A 7/1970

OTHER PUBLICATIONS

International/Search Report issued to PCT/US2022/081678 on Jun. 19, 2023.

Kemp, "The physics of unwound and wound strings on the electric guitar applied to the pitch intervals produced by tremolo/vibrato arm systems", Music Centre, University of St. Andrews, St Andrews Fife, United Kingdom, 2 SUPA, School of Pyhsics & Astronomy, PLOS ONE, Sep. 21, 2017.

Invitation to Pay Fees Issued to PCT/US2022/081678 on Apr. 4, 2023.

* cited by examiner

*Primary Examiner* — Kimberly R Lockett
(74) *Attorney, Agent, or Firm* — Patterson + Sheridan, LLP

(57) ABSTRACT

A vibrato mechanism for a string instrument. Embodiments include a bar with a plurality of segments, each respective segment of the plurality of segments being configured to connect to a respective string of a plurality of strings of a string instrument. In some embodiments, a first segment of the plurality of segments has a first size and is configured to connect to a first string of the plurality of strings having a first tension, and a second segment of the plurality of segments has a second size that is different than the first size and is configured to connect to a second string of the plurality of strings having a second tension that is different than the first tension. Embodiments include an actuator arm that is operatively connected to the bar such that the actuator arm, when engaged, causes the bar to rotate about its longitudinal axis.

19 Claims, 18 Drawing Sheets

VIBRATO MECHANISM

BACKGROUND

Field

Embodiments of the present disclosure generally relate to vibrato mechanisms for a string instrument. Certain embodiments of the disclosure relate to a vibrato mechanism including a bar with segments of varying size. In some embodiments, a vibrato mechanism includes protrusions that, when in contact, prevent rotation of a bar in a given direction about its longitudinal axis.

Description of the Related Art

A string instrument (sometimes referred to as a stringed instrument) such as a guitar is generally comprised of a solid or hollow resonant body commonly made from one or more woods, or similar material. Attached to this main instrument body is a slender extension commonly referred to as a neck, to which are attached a plurality of strings anchored with adjustable pegs used to control the tension of the strings. The distal end of the strings is attached to a bridge where vibration of the strings is transferred to the body of the instrument in order to amplify the vibration of the strings and make the vibration audible.

The vibrating length of strings is determined by two fixed points of contact perpendicular to the length of the strings, one point near the adjustable anchoring pegs, and one point on the body of the guitar (e.g., a bridge and/or tailpiece). The strings are stretched taut over these two points of contact. A musician will strum or pluck these strings to set them in motion, creating sound. The pitch of the notes played is determined by stopping the strings against the neck, altering their speaking or vibrating length and corresponding frequency.

A vibrato mechanism, sometimes referred to as a tremolo mechanism, generally includes a bar to which the strings of a guitar are connected and a component (e.g., actuating arm) that, when engaged by a player of the guitar, causes the bar to rotate, thereby modulating pitches produced by the strings when strummed or plucked. Thus, the vibrato mechanism allows the tension applied to the strings to be readily varied to produce a vibrato effect.

Existing vibrato mechanisms generally suffer from two problems. First, as the player lowers the string pitch with the actuating arm of the vibrato mechanism, the pitches of the strings do not all lower by the same amount due to the differences in tension and elasticity of the strings themselves. Second, when a player bends a string on a guitar fitted with a vibrato mechanism, the vibrato mechanism may cause the other strings to lower in pitch to balance the overall string tension.

As such, there is a need in the art for improved vibrato mechanisms that address the drawbacks of existing designs.

SUMMARY

The present disclosure generally relates to a vibrato mechanism for a string instrument.

One embodiment provides a vibrato mechanism, comprising: a bar comprising a plurality of segments, wherein: each respective segment of the plurality of segments is configured to connect to a respective string of a plurality of strings of a string instrument; a first segment of the plurality of segments has a first size and is configured to connect to a first string of the plurality of strings having a first tension; a second segment of the plurality of segments has a second size that is different than the first size and is configured to connect to a second string of the plurality of strings having a second tension that is different than the first tension; and an actuator arm that is operatively connected to the bar such that the actuator arm, when engaged, causes the bar to rotate about its longitudinal axis.

Another embodiment provides a vibrato mechanism, comprising: a bar configured to connect to a plurality of strings of a string instrument; and an actuator arm that is operatively connected to the bar such that the actuator arm, when engaged, causes the bar to rotate about its longitudinal axis, wherein: the bar comprises a first stop protrusion that is configured to contact a second stop protrusion attached to the vibrato mechanism when the actuator arm is not engaged; and contact between the first stop protrusion and the second stop protrusion prevents the bar from rotating in a given direction about its longitudinal axis.

Another embodiment provides a guitar comprising one of the vibrato mechanisms set forth above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
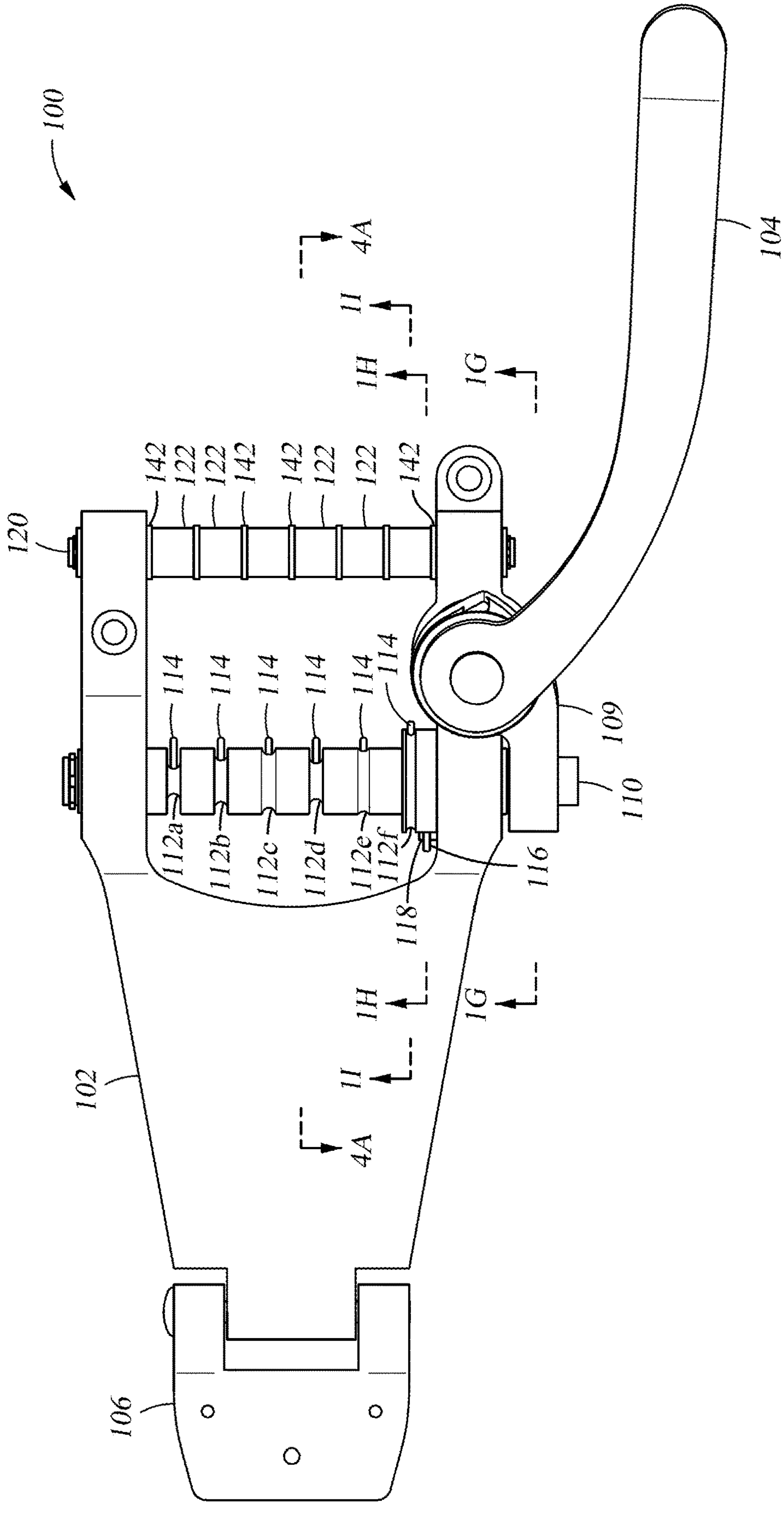
FIGS. 1A-1I are various views of a vibrato mechanism according to embodiments of the present disclosure.

The present disclosure relates to a vibrato mechanism with varying diameters suited to the expected properties of each string and/or with a stop mechanism for preventing unintended string movement.

According to certain embodiments, a vibrato mechanism comprises a tailpiece unit for a string instrument. Examples of existing designs for such a unit are shown in U.S. Design Pat. No. 169,120 and U.S. Design Pat. No. 170,109, the contents of each of which are incorporated herein by reference in their entirety.

The basic components of such a vibrato mechanism may include a bar to which strings are attached and an actuator arm operatively connected to the bar such that, when the actuator arm is engaged (e.g., by pressing the actuator arm towards the body of the instrument or pulling the actuator arm away from the body of the instrument), the actuator arm causes the bar to rotate about its longitudinal axis, thereby decreasing or increasing the tension of the strings and, consequently, lowering or raising the pitches of the strings when strummed or plucked. A short, stiff spring mounted between the unit's base and a cup attached to the actuator arm brings the bar back to its resting position when the actuator arm is released, thereby restoring the regular pitches of the strings.

However, with existing designs, the pitches of the strings do not change uniformly as the bar rotates due to differences in properties of the strings, such as tension and/or elasticity (e.g., which may be based on materials of which the strings are made, diameters of the strings, whether the strings are wound, and/or the like). Thus, because the pitches of different strings deviate by different relative intervals during operation of the vibrato mechanism with existing designs, chords will become discordant when such vibrato mechanisms are engaged.

There have been previous attempts to address these problems through particular vibrato designs involving multiple moving parts that attempt to individually control movements of each string, but these designs have certain drawbacks. For example, the complexities introduced by the inclusion of multiple moving parts to adjust for small movements cause these designs to be unreliable and prone to maladjustment. Furthermore, the vibrato effect produced by these designs often has a poor sound quality due to string energy loss from the large number of moving pieces. As a result, none of these designs have ever been widely adopted for use by players.

Accordingly, as described in more detail below with respect to FIGS. 1A-F, techniques described herein involve a vibrato mechanism with a bar (e.g., which may be referred to as a string anchoring bar) that comprises a separate segment (which may be referred to a string seat or string ramp) for each string, with the segments varying in size (e.g., thickness, which may refer to diameter or large axis, and/or shape) based on the expected properties of the different strings. If the vibrato mechanism is configured for a guitar, the bar may include six segments of varying size, and each of the six strings of the guitar may attach to a corresponding segment. The size (e.g., diameter in the case of a rounded bar, large axis in the case of an oval shaped bar, or shape in the case of segments of varying shapes) of a segment is determined based on one or more properties of the string to which it corresponds. For example, producing a given amount of pitch change for a string with a higher amount of tension may require a greater amount of change in string length than would be required to produce the same amount of pitch change for a string with a lower amount of tension. Thus, to account for these differences, the size of a segment to which a higher-tension string is attached may be greater than the size of a segment to which a lower-tension string is attached, thereby achieving a greater amount of string length change for the higher-tension string than for the lower-tension string with the same amount of bar rotation. As a result, the pitches of the higher-tension string and the lower-tension string change uniformly as the actuator arm is engaged. Embodiments of the present disclosure therefore improve upon existing vibrato designs by accounting for relative differences in properties among strings through variations in size among segments of a bar to which strings are attached. It is noted that, in some embodiments, segments of varying shapes may be used in order to achieve varying amounts of string length change that correspond to expected properties of strings.

It is noted that the "size" of a segment, as used herein, generally refers to a thickness, diameter (e.g., in the case of a circular segment), large axis (e.g., in the case of an oval shaped segment), or similar dimension of a segment, and does not generally refer to a width of a segment along the length of the bar. Segments of varying size may have varying shapes such that the differences in shape account, at least in part, for the differences in size. For example, the segments may be oval-shaped cylindrical segments that vary in large axis length, but that do not necessarily vary in small axis length, and therefore vary in size (and shape).

While certain embodiments are described with respect to a guitar having six strings, vibrato mechanisms described herein may be utilized with a guitar having a different number of strings and/or with another type of string instrument.

Vibrato mechanisms described herein avoid shortcomings of other designs that have been developed to address the relative differences in pitch change among strings. For example, by avoiding the complexities associated with designs in which each string is attached to an independently moving component (e.g., with its own spring mechanism) that must be precisely tuned to the properties of the individual string, embodiments of the present disclosure avoid the impracticality, likelihood of maladjustment, and loss of string energy associated with such designs.

Furthermore, in some embodiments, the vibrato mechanism may include a stop mechanism to prevent unintended string movement, such as when a player bends a string. The stop mechanism may comprise a first stop protrusion attached to the bar and a second stop protrusion attached to a base piece of the vibrato mechanism. The first stop protrusion and the second stop protrusion may be in contact when the actuator arm is at rest, and contact between the first stop protrusion and the second stop protrusion may prevent the bar from rotating in a given direction about its longitudinal axis. The pressure from the spring that is situated between the base of the vibrato mechanism and the actuator arm may press the first stop protrusion against the second stop protrusion when the actuator arm is not engaged. For example, the stop mechanism may prevent the bar from rotating in such a manner as to increase the tensions of the strings (e.g., preventing raising the corresponding string pitches), thereby limiting rotation of the bar to a direction that reduces the tensions of the strings (e.g., allowing lowering of the corresponding string pitches). In one example, the stop mechanism functions such that the actuator arm can be pressed toward the body of the instrument to lower the pitches of the strings but cannot be pulled away from the body of the instrument to raise the pitches of the strings. The stop mechanism allows pressure from the spring to overcome increases in string tension such that when the player bends one string (e.g., thereby increasing the pressure of that one string), the spring pressure prevents unintended changes in tension of the other strings that would otherwise occur (e.g., due to incidental rotation of the bar in attempt to balance the overall string tension). For example, with stop mechanisms according to embodiments of the present disclosure, spring pressure is no longer used to balance string tension, but is instead used only to return the string tension to its initial state when the actuator arm is released.

A stop mechanism according to embodiments of the present disclosure avoids shortcomings of existing designs for stop mechanisms. For example, some existing stop mechanisms rely on the body of the instrument as a stop. However, these designs require the instrument to have a solid body and a top that is a completely flat surface, which is often not the case with electric guitars. Other existing stop mechanisms involve an altered spring with a built-in hard stop that can only be utilized with a combination bridge and tailpiece unit. However, the components in these designs often cause unintended issues, such as an undesirable stickiness associated with engaging the actuator arm. Thus, by utilizing protrusions that contact one another to prevent rotation of the bar in a given direction, stop mechanisms described herein are compatible even with guitars that do not have solid bodies and/or flat tops, can be used with vibrato mechanisms that are not combination bridge and tailpiece units, and avoid stickiness associated with springs that are altered to include a built-in hard stop.

Certain embodiments further include an additional bar configured to contact the strings at a point between the string anchoring bar and the neck of the string instrument. The additional bar may be referred to as a tension roller bar, and may serve the function of ensuring that the strings have sufficient tension to remain in place (e.g., in one or more saddles) during playing. Furthermore, the additional bar may unify the pressure and angle at which the string sit on a saddle of a separate bridge unit. With a conventional vibrato mechanism having a string anchoring bar with a uniform diameter, the angle is similar for all of the strings as they extend away from the string anchoring bar. However, when the string anchoring bar includes segments of varying size as described herein, the angles are different for each string without this component.

For example, the additional bar may be configured such that the strings extend between the additional bar and the body of the string instrument, contacting a bottom surface of the additional bar. According to embodiments of the present disclosure, the additional bar may comprise a plurality of independently rotating components to account for the different amounts of linear string travel of different strings produced by operation of the vibrato mechanism according to embodiments of the present disclosure. For example, the independently rotating components may be separate cylinders that rotate about a common shaft. In some cases, the independently rotating components may be separated by dividers (e.g., made of a low-density material such as rubber or silicone) to prevent friction. The independently rotating components may serve to isolate movements of the strings from one another and avoid movements of one string affecting movements of other strings.

Figure 1B:
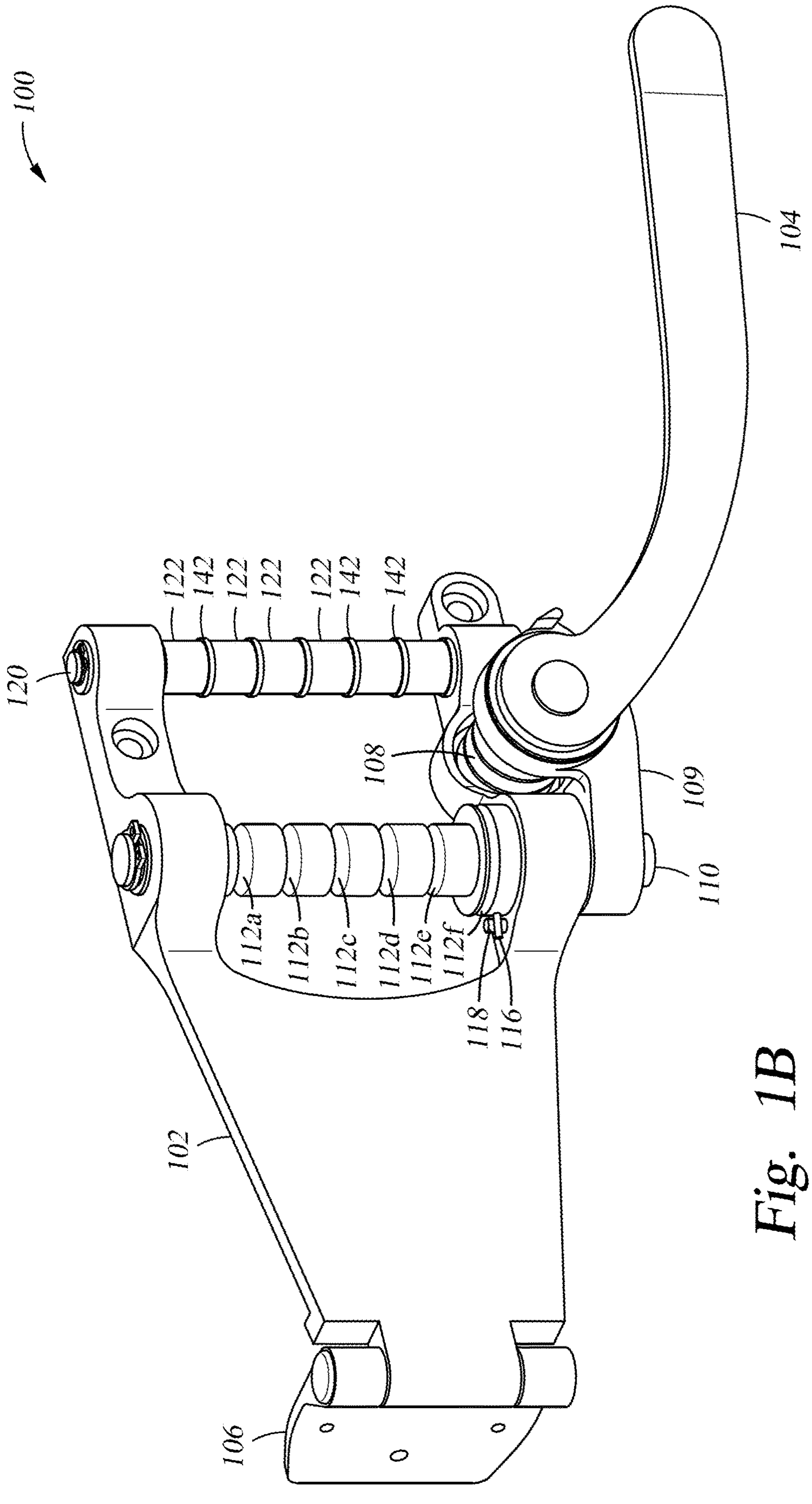
Figure 1C:
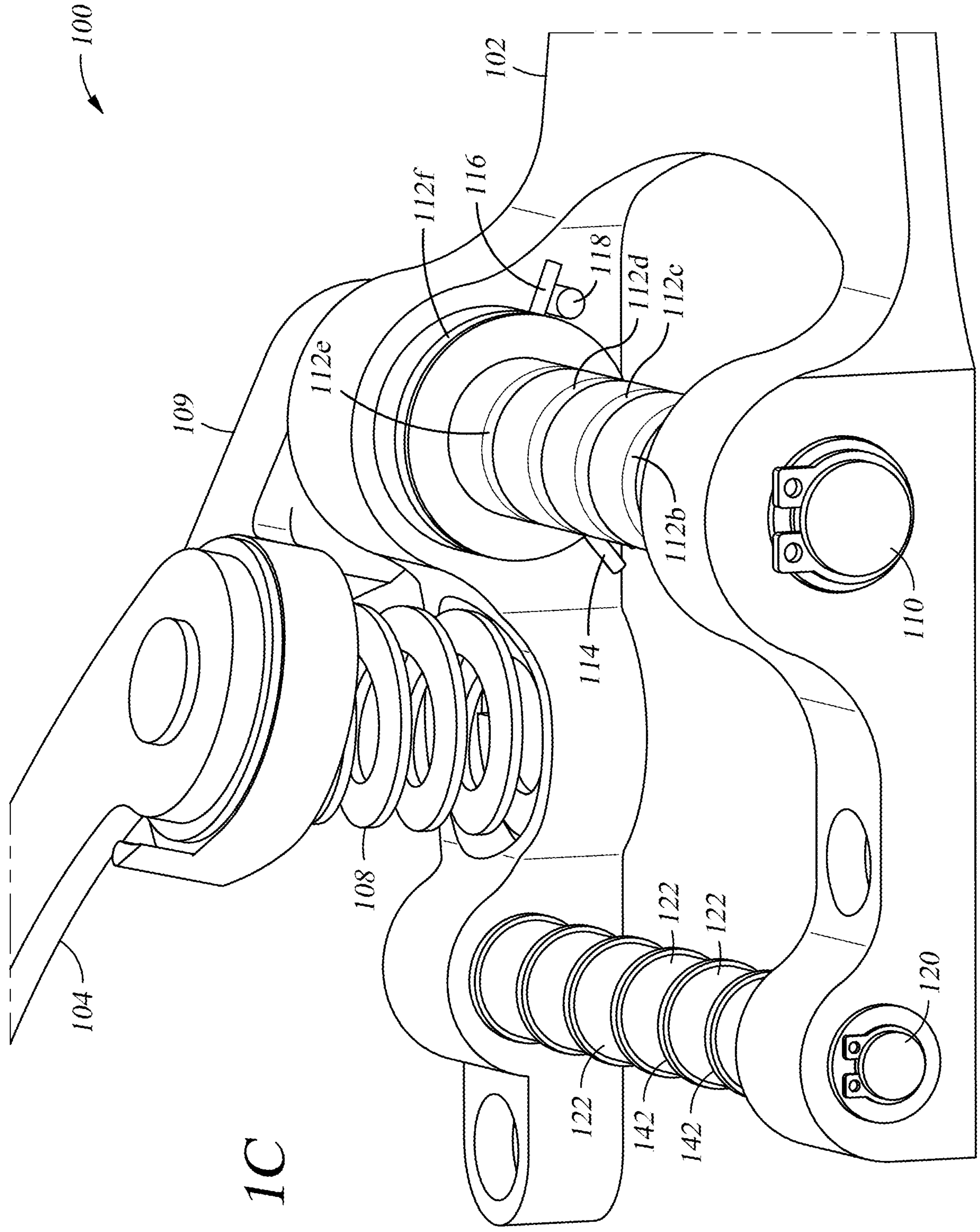
Figure 1D:
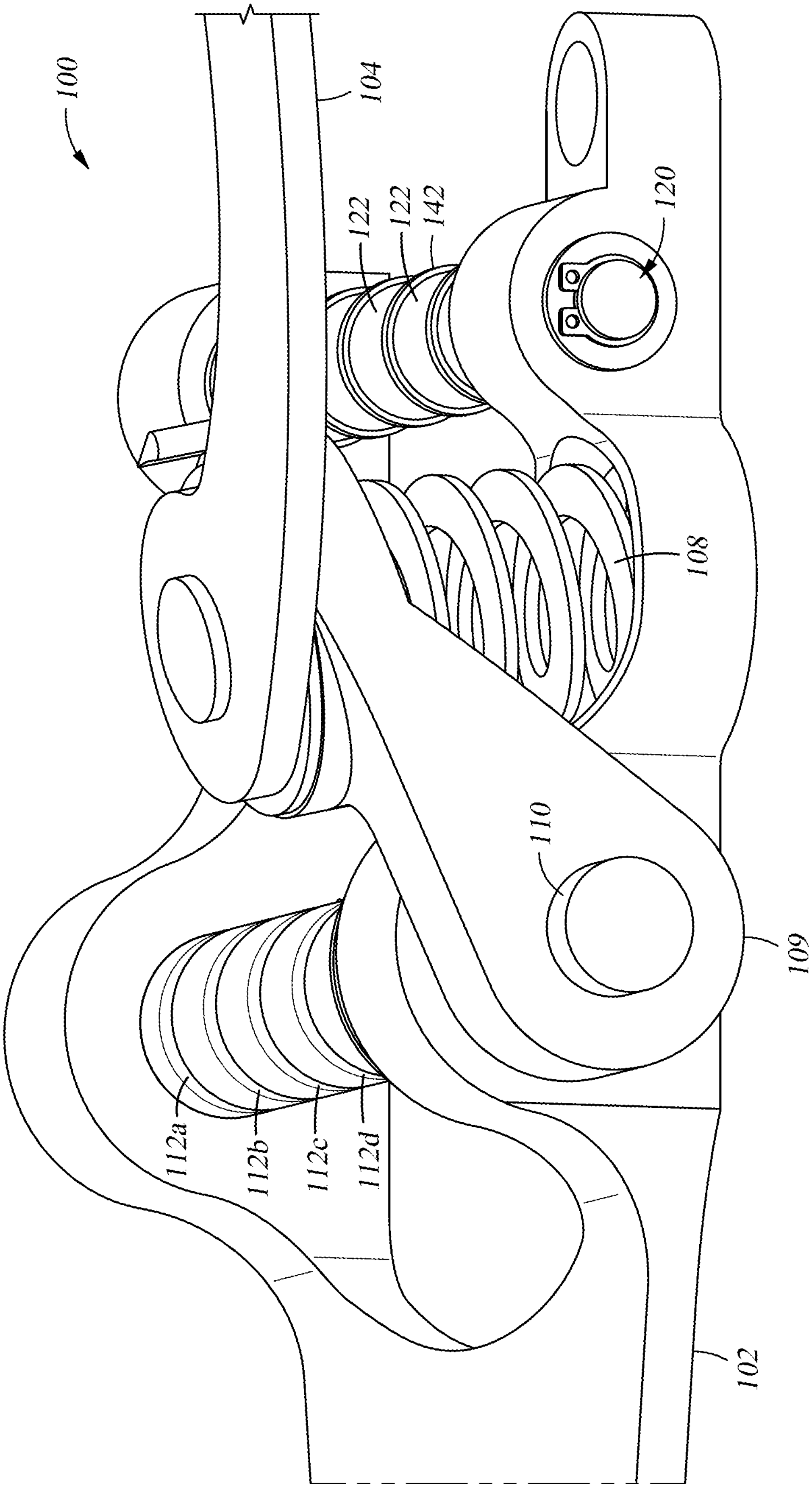
Figure 1E:
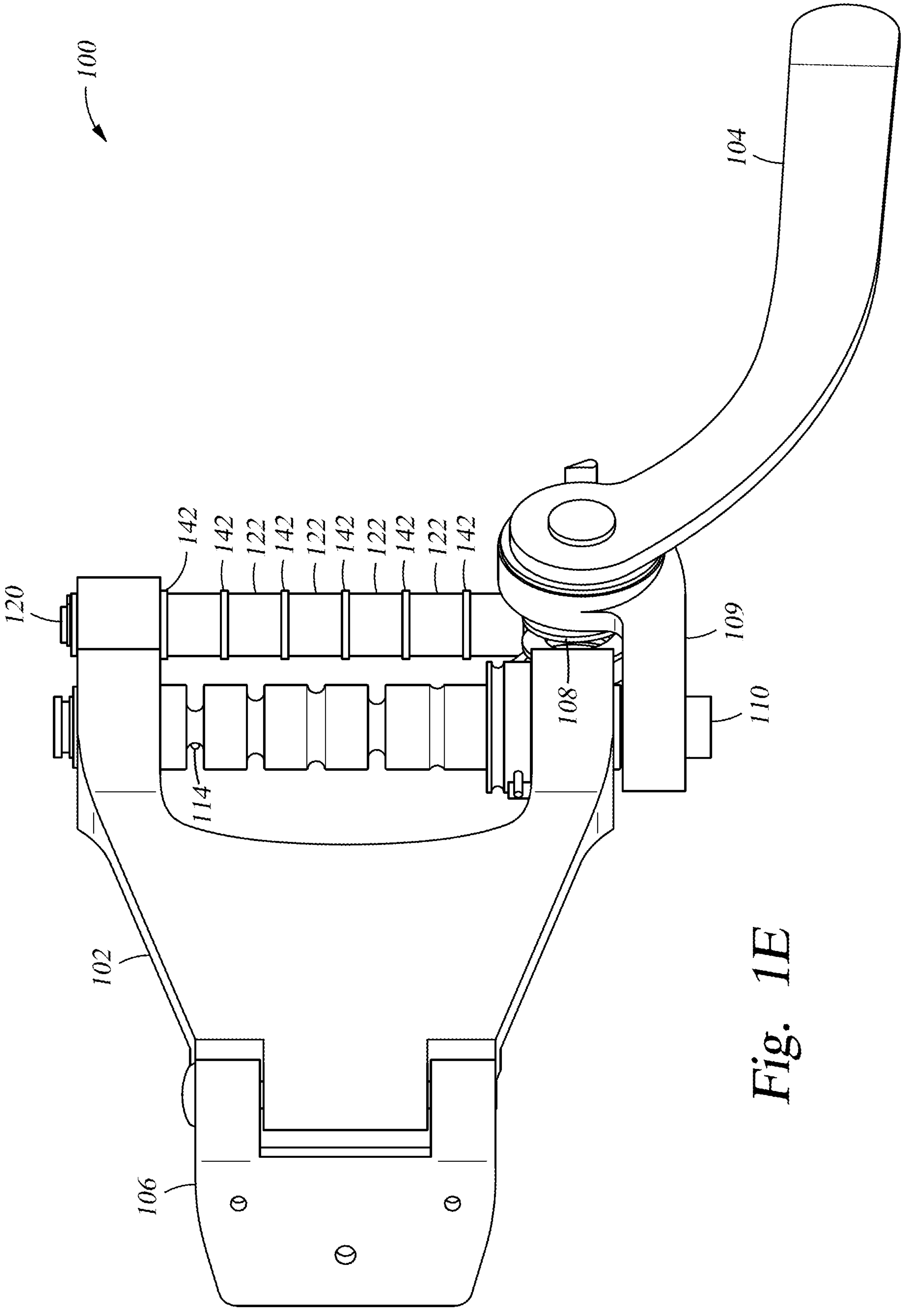
Figure 1F:
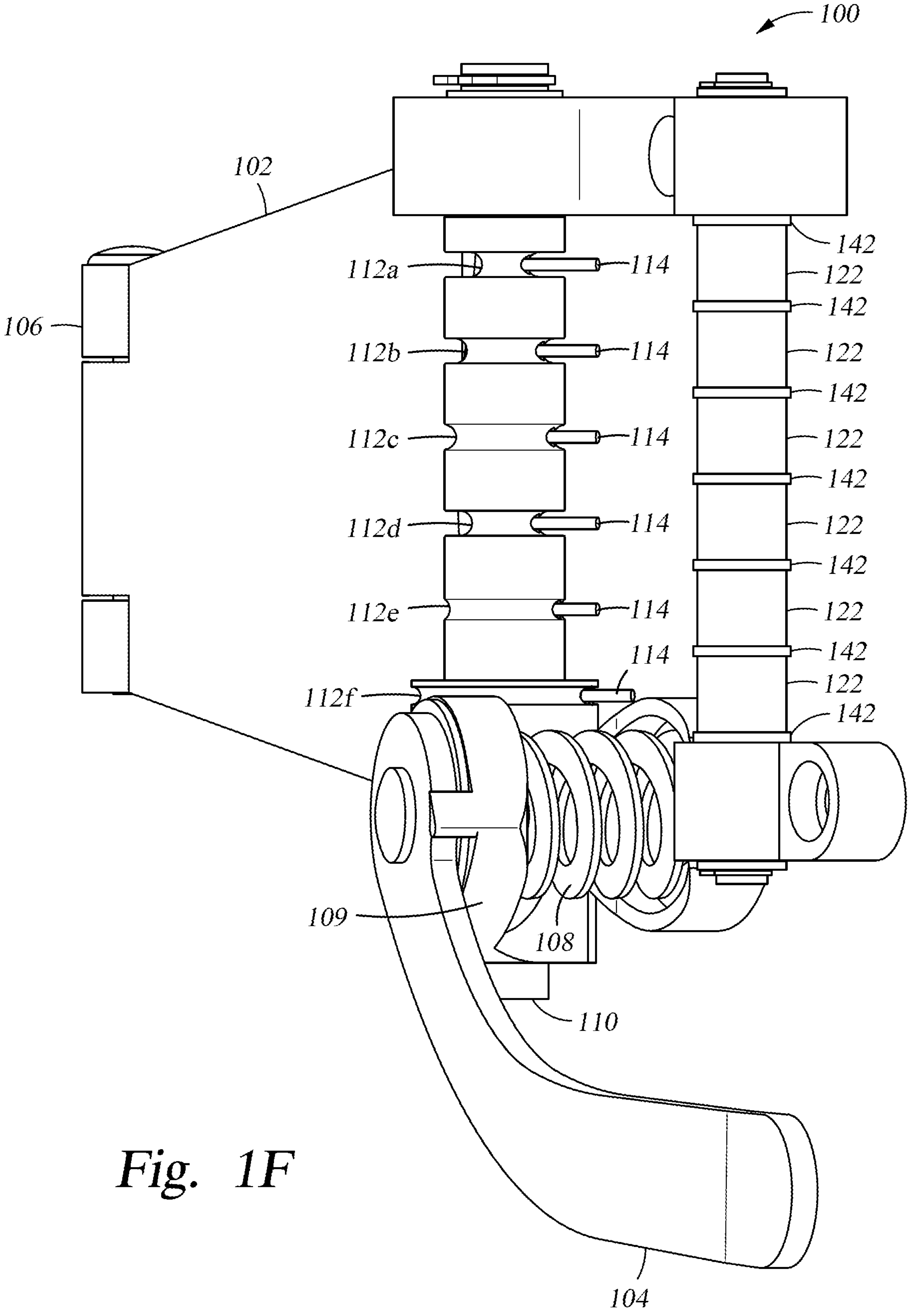
Figure 1G:
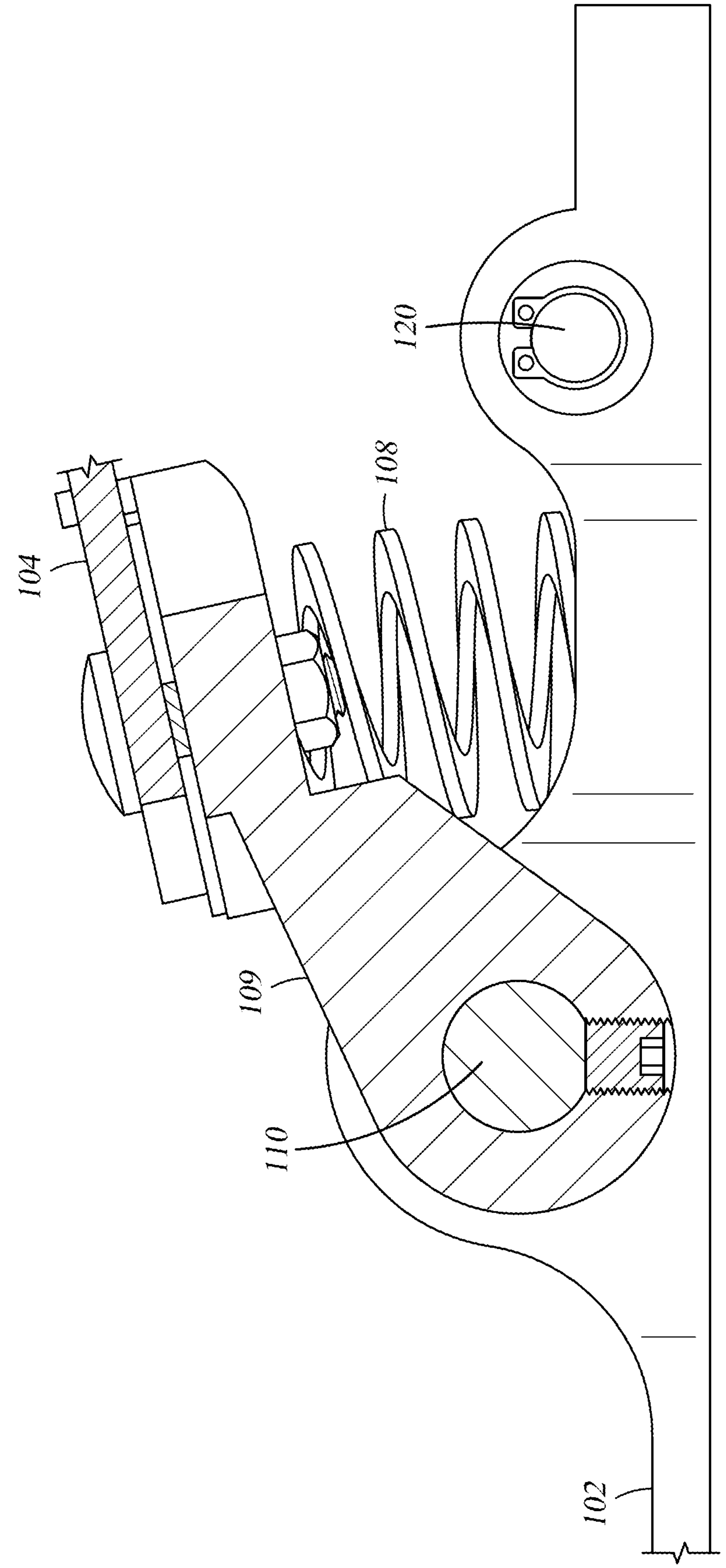
Figure 1H:
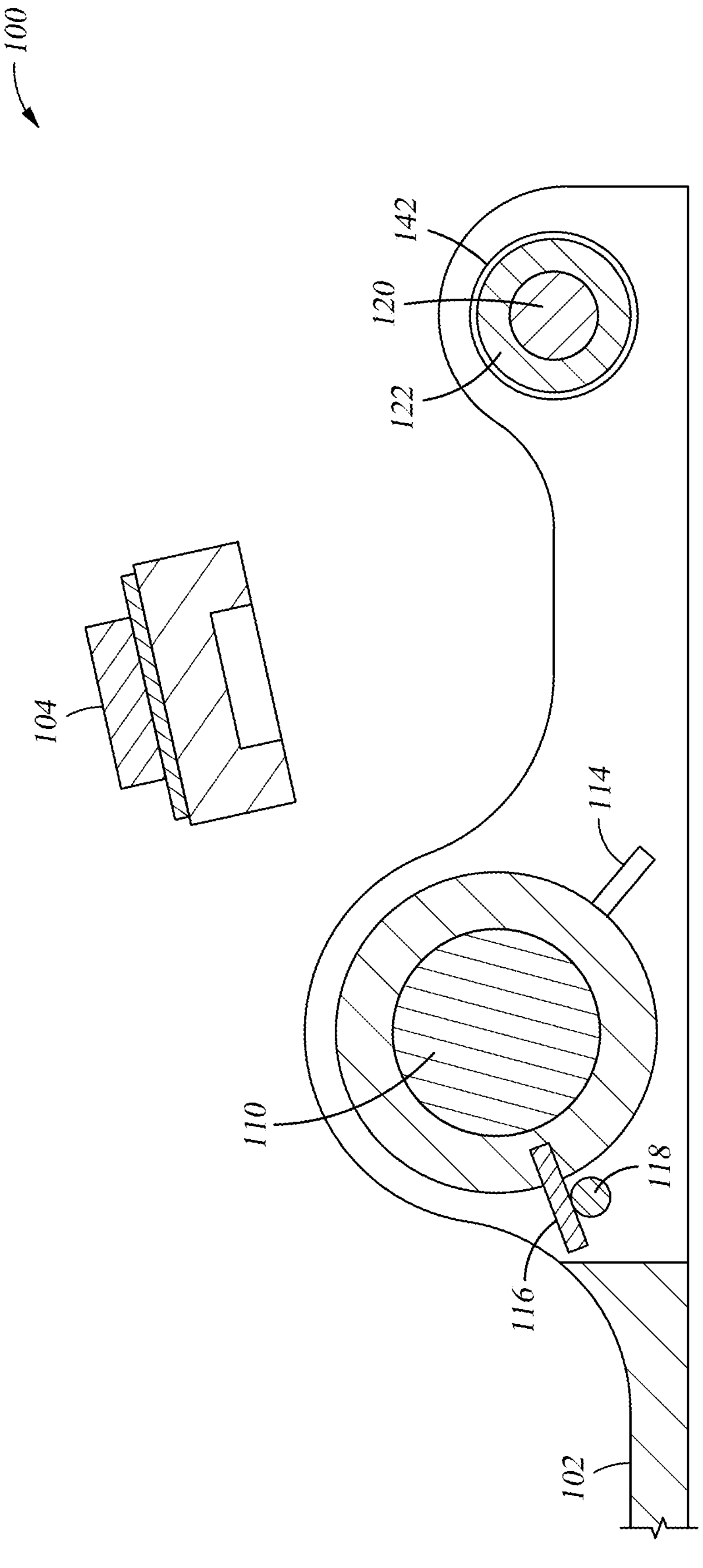
Figure 1I:
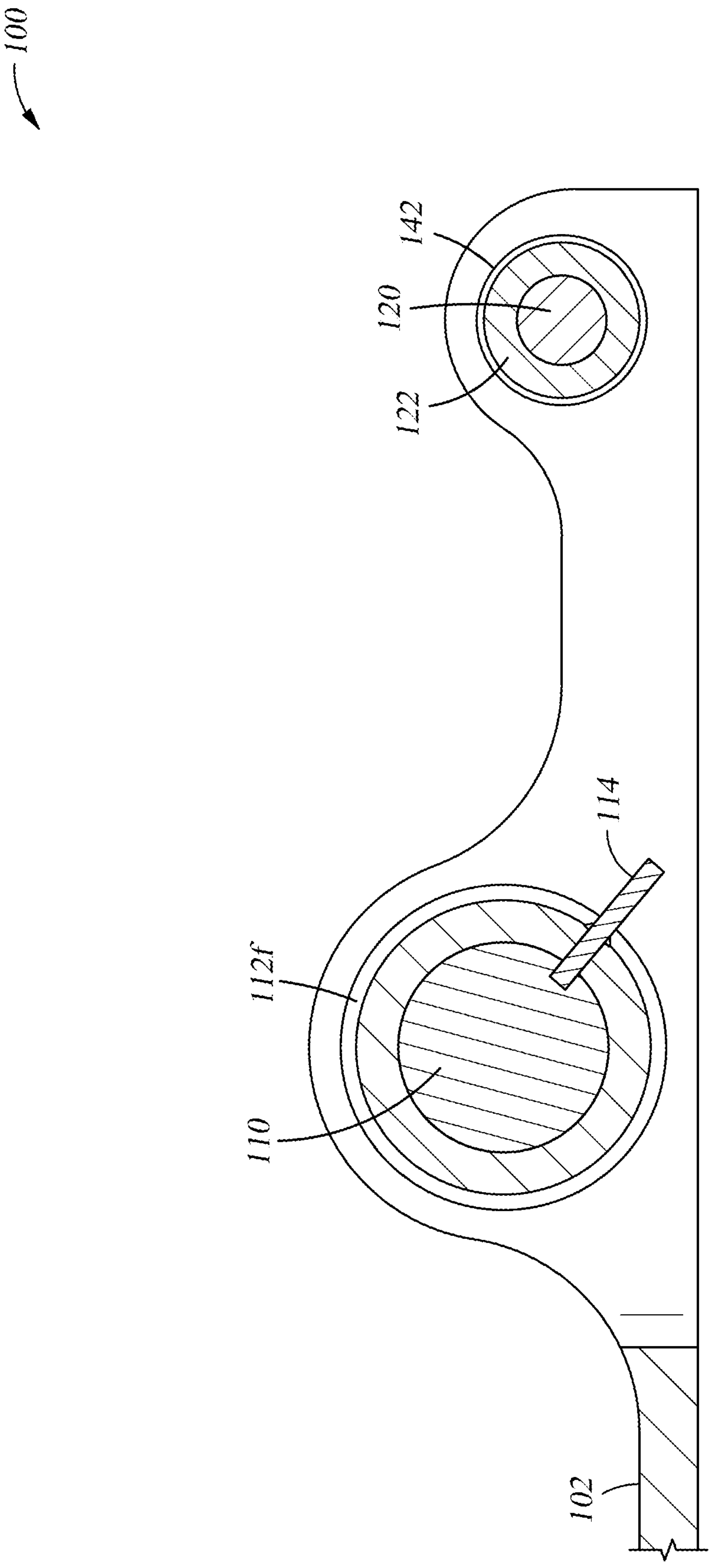

FIGS. 1A-1I depict different views of a vibrato mechanism 100 for a string instrument. FIG. 1A is a top view, FIG. 1B is an isometric view, FIG. 1C is a side view, FIG. 1D is another side view, FIG. 1E is another side view, FIG. 1F is another side view, FIG. 1G is a cross-sectional side view, FIG. 1H is another cross-sectional side view, and FIG. 1I is yet another cross-sectional side view of vibrato mechanism 100.

As shown, vibrato mechanism 100 includes a base 102 and a bracket 106, which are configured to attach to a string instrument (e.g., to a top and side surface of the string instrument, respectively). In some embodiments, vibrato mechanism 100 may be attached to a string instrument via one or more screws.

Vibrato mechanism 100 includes an actuator arm 104 that is operatively connected to a bar 110 such that, when actuator arm 104 is engaged (e.g., pressed towards the instrument), bar 110 is caused to rotated about its longitudinal axis. Actuator arm 104 if connected to a spring 108 that extends between base 102 and a component 109 beneath actuator arm 104 and causes actuator arm 104 to return to its resting position when it is released.

Bar 110 (which may be referred to as a string anchoring bar) comprises a plurality of segments $\mathbf{112}_{a-f}$ (which may be referred to collectively as segments 112 and individually as segment 112) of varying size. For instance, segment $\mathbf{112}_f$ has the greatest size and segment $\mathbf{112}_a$ has the smallest size. The size of each segment 112 may be based on expected properties, such as expected tension and elasticity, of a string to which the segment 112 is configured to connect. In one embodiment, segments 112 are round cylindrical segments and the size of each segment 112 refers to its diameter. In another embodiment, segments 112 are oval shaped cylindrical segments and the size of each segment 112 refers to its large axis. In other embodiments, segments 112 may take different forms, such as oval and/or egg shaped camshafts, irregular-length slots ground into particular diameters, and/or the like. In some embodiments, segments 112 may have differing shapes. For example, segments 112 may be cylindrical segments of differing shapes, such as circular and/or oval shaped segments with differing dimensions (e.g., one segment may be circular while another segment may be an oval with particular dimensions). In alternative embodiments, segments 112 may be squared, rectangular, hexagonal, octagonal, and/or the like.

Segments 112 include protrusions 114 to which strings of a string instrument attach. For instance, as described in more detail below with respect to FIG. 2, a loop at an end of a given string may attach to a protrusion 114 of a given segment 112. Other techniques for attaching strings to segments 112 may also be employed.

In certain embodiments, the size (e.g., diameter) of each segment 112 is calculated as a function of one or more properties of the string to which it is configured to connect, such as string diameter, tension, elasticity, and/or the like, and/or is determined based on experimentation. A variety of formulas and/or techniques may be used to determine segment size, and the present disclosure is not limited to any particular formula or technique. Furthermore, alternative embodiments may involve a bar or other type of component (e.g., having segments of varying size as described herein) that raises and lowers or performs some other type of movement, rather than rotating, in order to cause linear string travel when the actuator arm is engaged.

In some embodiments, different versions of vibrato mechanism 100 may be created for different sets of strings. For instance, an alternative version of vibrato mechanism 100 may be configured for a string set that includes a wound G string, and may include a larger diameter for segment $\mathbf{112}_d$ than that used for a non-wound G string (e.g., depicted) due to the higher tension of a wound G string as compared to a non-wound G string.

One or more of segments 112 may be configured as grooves within bar 110 (e.g., separated by raised portions of bar 110) so that the strings stay in place on their corresponding segments 112.

As described in more detail below with respect to FIGS. 3A and 3B, vibrato mechanism 100 comprises a stop mechanism that includes stop protrusions 116 and 118. Stop protrusion 116 is attached to bar 110 and stop protrusion 118 is attached to base 102. When actuator arm 104 and bar 110 are at rest, stop protrusion 116 contacts stop protrusion 118. Pressure from spring 108 presses stop protrusions 116 and 118 against one another. Stop protrusions 116 and 118 allow for the pressure of spring 108 to be increased to the point that it is strong enough to overcome changes in string tension, as spring pressure is not used as a balance but, rather, as a means of returning actuator arm 104 and bar 110 to their rest positions when actuator arm 104 is released.

When actuator arm 104 is pressed towards the top surface of the instrument (overcoming the pressure of spring 108), the resultant rotation of bar 110 about its longitudinal axis in a first direction (e.g., counter-clockwise from the perspective of FIG. 1C) causes stop protrusion 116 to separate from stop protrusion 118. When actuator arm 104 is released, the resultant return of bar 110 to its rest position (e.g., via clockwise rotation about is longitudinal axis from the perspective of FIG. 1C) as a result of spring 108 causes stop protrusion 116 to once again contact stop protrusion 118. The contact between stop protrusion 116 and stop protrusion 118 when actuator arm 104 and bar 110 are in their rest positions prevents bar 110 from rotating about its longitudinal axis in the other direction (e.g., clockwise from the perspective of FIG. 1C). Thus, an attempt to pull actuator arm 104 away from the top surface of the instrument would not result in rotation of bar 110 or any resultant raising of string pitch. This stop mechanism (and the amount of spring pressure that it enables) prevents unintended rotation of bar 110, such as due to bending of a string by a player, thereby preventing unintended changes in string pitch.

In some embodiments (not shown), stop protrusion 116 and/or stop protrusion 118 may be retractable or movable such that, if a player wishes to use vibrato mechanism 100 to raise the pitches of the strings, the stop mechanism may be dynamically disengaged. For example, stop protrusion 116 and/or stop protrusion 118 may be configured to retract into a corresponding depression within bar 110 and/or base 102 (e.g., when pushed into the corresponding depression and/or when some other retraction trigger is activated) or moved into one or more different positions so that they do not contact one another when actuator arm 104 and bar 110 are at rest. The stop mechanism may then be dynamically re-engaged, such as by pulling, pushing, and/or moving stop protrusion 116 and/or stop protrusion 118, and/or activating some other trigger to cause stop protrusion 116 and stop protrusion 118 to return to contact with one another.

It is noted that other embodiments of vibrato mechanism 100 may not include stop protrusions 116 and 118. Furthermore, some embodiments of vibrato mechanism 100 may include stop protrusions 116 and 118 without including segments 112 (e.g., including instead a bar with a uniform size or different types of components for attaching strings to vibrato mechanism 100).

Vibrato mechanism 100 further comprises an additional bar 120, which may be referred to as a tension roller. As shown, bar 120 comprises a plurality of independently rotating components 122 separated and bounded by dividers 142. Components 122 may be separate cylindrical cams that rotate about a common underlying shaft. Dividers 142 may be made of a low-density material such as rubber or silicone, and may serve to isolate components 122 from one another and to prevent friction as components 122 rotate. Thus, components 122 and dividers 142 of bar 120 allow string tension to be increased (e.g., by applying pressure to strings) without allowing movement of one string to affect other strings, and while preventing loss of string energy that may have otherwise occurred due to friction between moving parts. In an example embodiment, the strings that are attached to segments 112 of bar 110 via protrusions 114 extend beneath bar 120 at a point between bar 110 and a neck of the string instrument, and components 122 contact the strings to increase string tension and optimize the break angles of the strings.

If a conventional tension roller, rather than bar 120, was to be used in conjunction with bar 110, the unified rotation of the conventional tension roller across all strings may interfere with the independent amounts of linear string travel caused by the varying diameters of segments 112. Thus, bar 120 includes an independently rotating component 122 for each string.

It is noted that some embodiments of vibrato mechanism 100 may not include a tension roller such as bar 120.

Figure 2A:
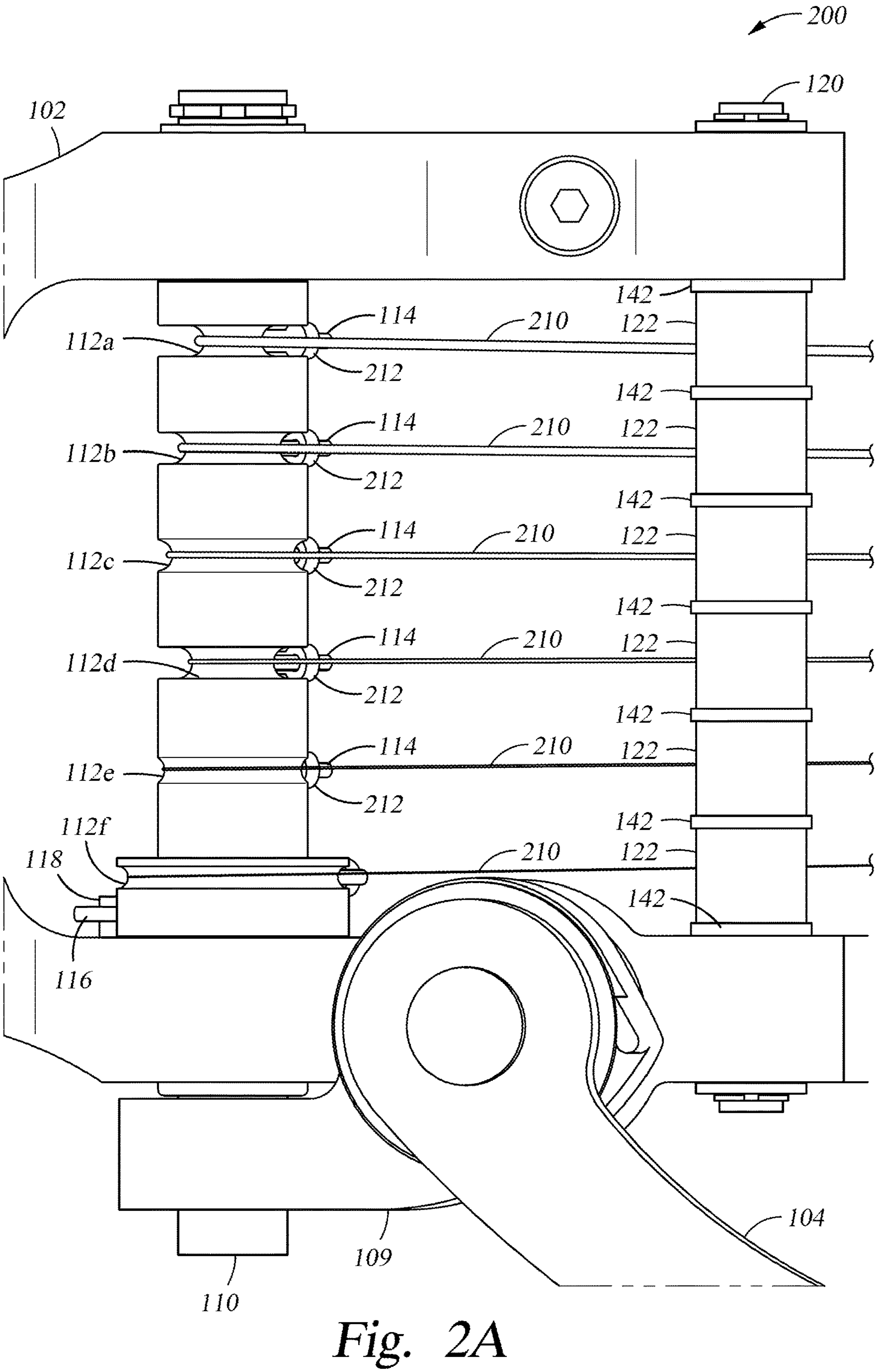
FIG. 2A illustrates an example manner of attaching strings to a vibrato mechanism according to embodiments of the present disclosure.

FIG. 2A is an illustration 200 of a manner in which strings may be attached to a vibrato mechanism according to embodiments of the present disclosure.

Illustration 200A includes vibrato mechanism 100 of FIGS. 1A-F, including bar 110 with segments 112 and protrusions 114. A plurality of strings 210 are attached to protrusions 114 via loops 212 at the ends of strings 210. For example, each loop 212 is connected to a corresponding protrusion 114 such that the loop 212 encircles the corresponding protrusion 114. Strings 210 loop around segments 112 and extend upwards (e.g., towards the neck of the guitar). The connections between loops 212 and protrusions 114 cause strings 210 to be held in place on bar 110 so that, when bar 110 rotates about its longitudinal axis (e.g., as a result of the actuator arm being engaged), strings 210 experience corresponding linear string travel (e.g., proportional to the diameters of segments 112), resulting in pitch change.

Figure 2B:
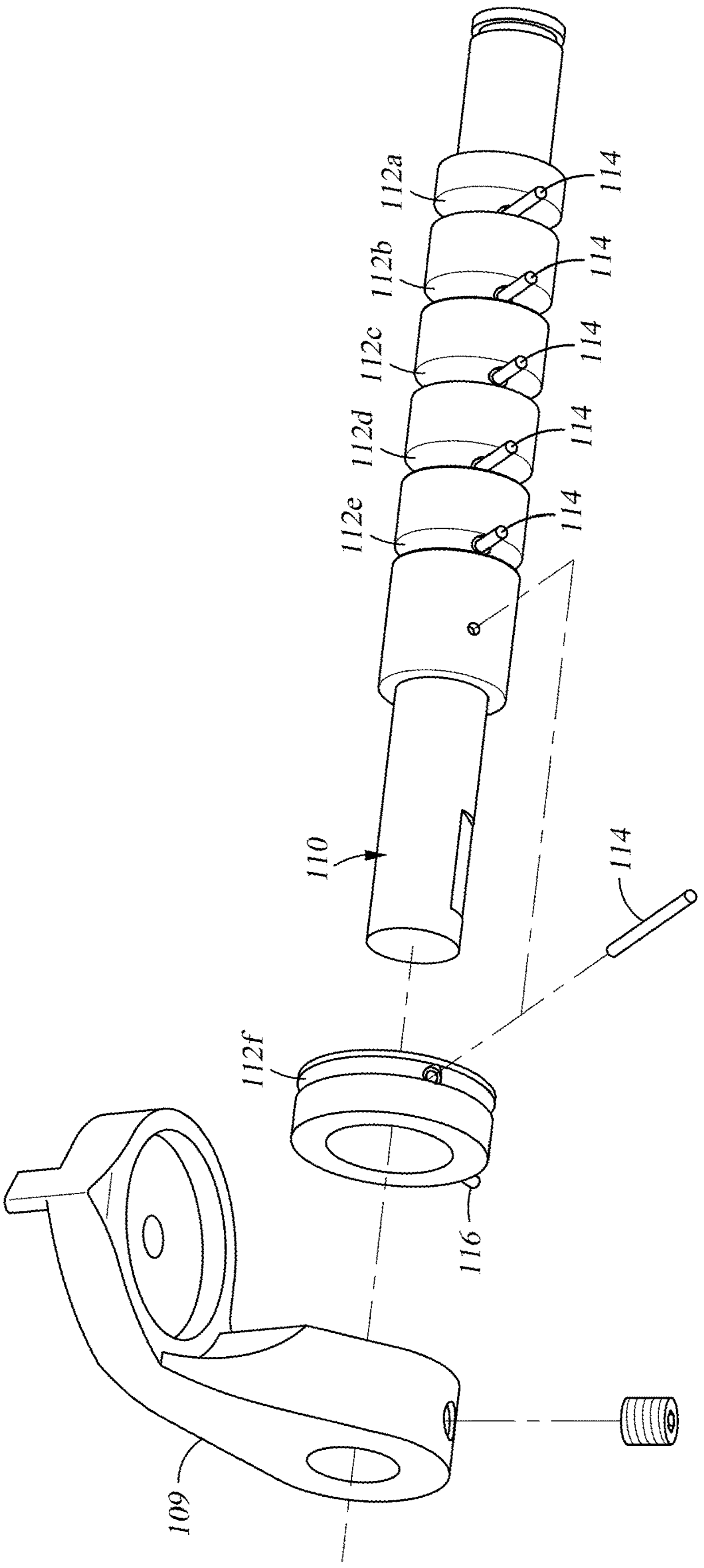
FIG. 2B illustrates an example exploded view of a string anchoring bar of a vibrato mechanism according to embodiments of the present disclosure.

FIG. 2B is an illustration 200B of an exploded view of a string anchoring bar according to embodiments of the present disclosure.

As shown in illustration 200B, segment 112$_f$ may be a separate component that encompasses the shaft of bar 110 and is attached to bar 110 via a string anchoring pin 114 (e.g., which is inserted through an opening in segment 112$_f$ and into a corresponding opening in an underlying portion of bar 110). In alternative embodiments, segment 112$_f$ may not be a separate component from the rest of bar 110 and/or one or more other segments 112 may be separate components. In some examples, one or more of segments 112 may be ground, milled, or otherwise comprise depressions into the shaft of bar 110. In some embodiments, segment 112$_f$ may be attached to the shaft of bar 110 in some other manner than via the string anchoring pin 114.

The shaft of bar 110 may be inserted into an opening in component 109 and/or may be attached to component 109 and/or base 102 via one or more other methods. In some embodiments, bar 110 may be attached to component 109 and/or base 102 via one or more snap rings and/or mounting screws.

Figure 2C:
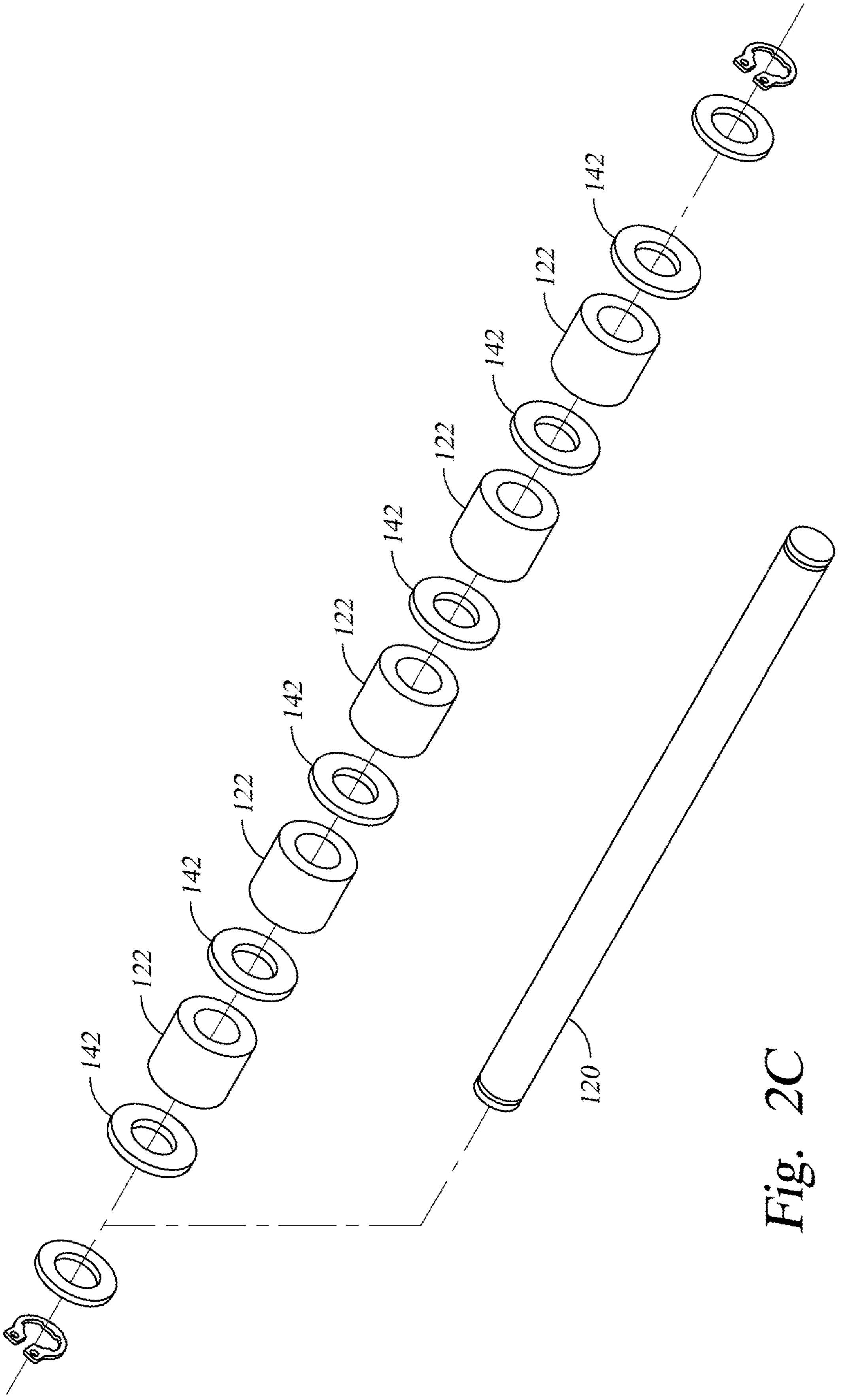
FIG. 2C illustrates an example exploded view of a tension roller of a vibrato mechanism according to embodiments of the present disclosure.

FIG. 2C is an illustration 200C of an exploded view of a tension roller according to embodiments of the present disclosure.

As shown in illustration 200C, bar 120 may comprise a common shaft that is encircled by independently rotating components 122 and dividers 142. Independently rotating components 122 may rotate about the common shaft independently of one another, with dividers 142 preventing friction and isolating movements of independently rotating components 122 from one another. In some embodiments, bar 120 may be attached to base 102 via one or more snap rings and/or mounting screws.

Figure 3A:
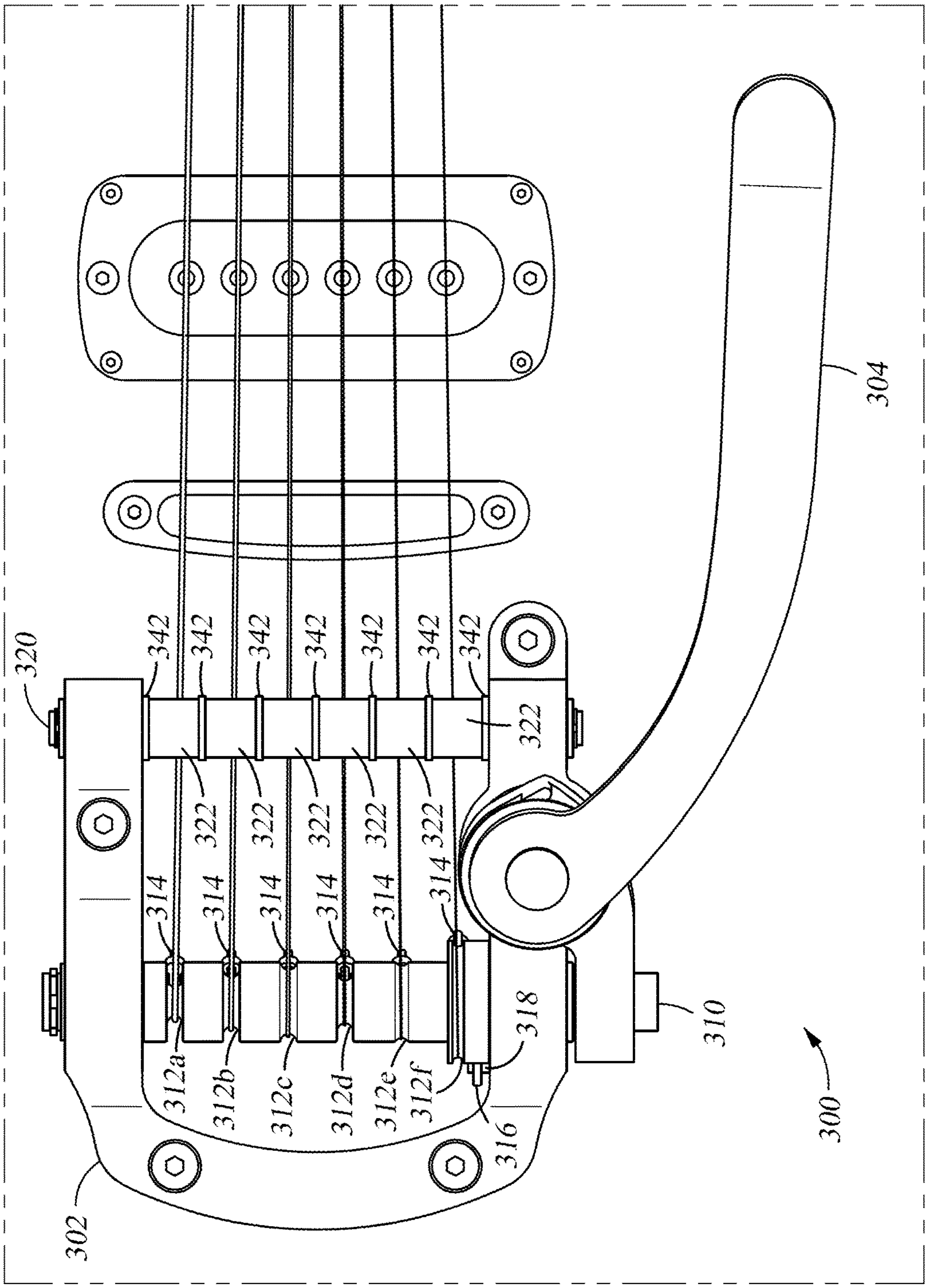
FIGS. 3A-3C are various views of a vibrato mechanism according to different embodiments of the present disclosure.
Figure 3B:
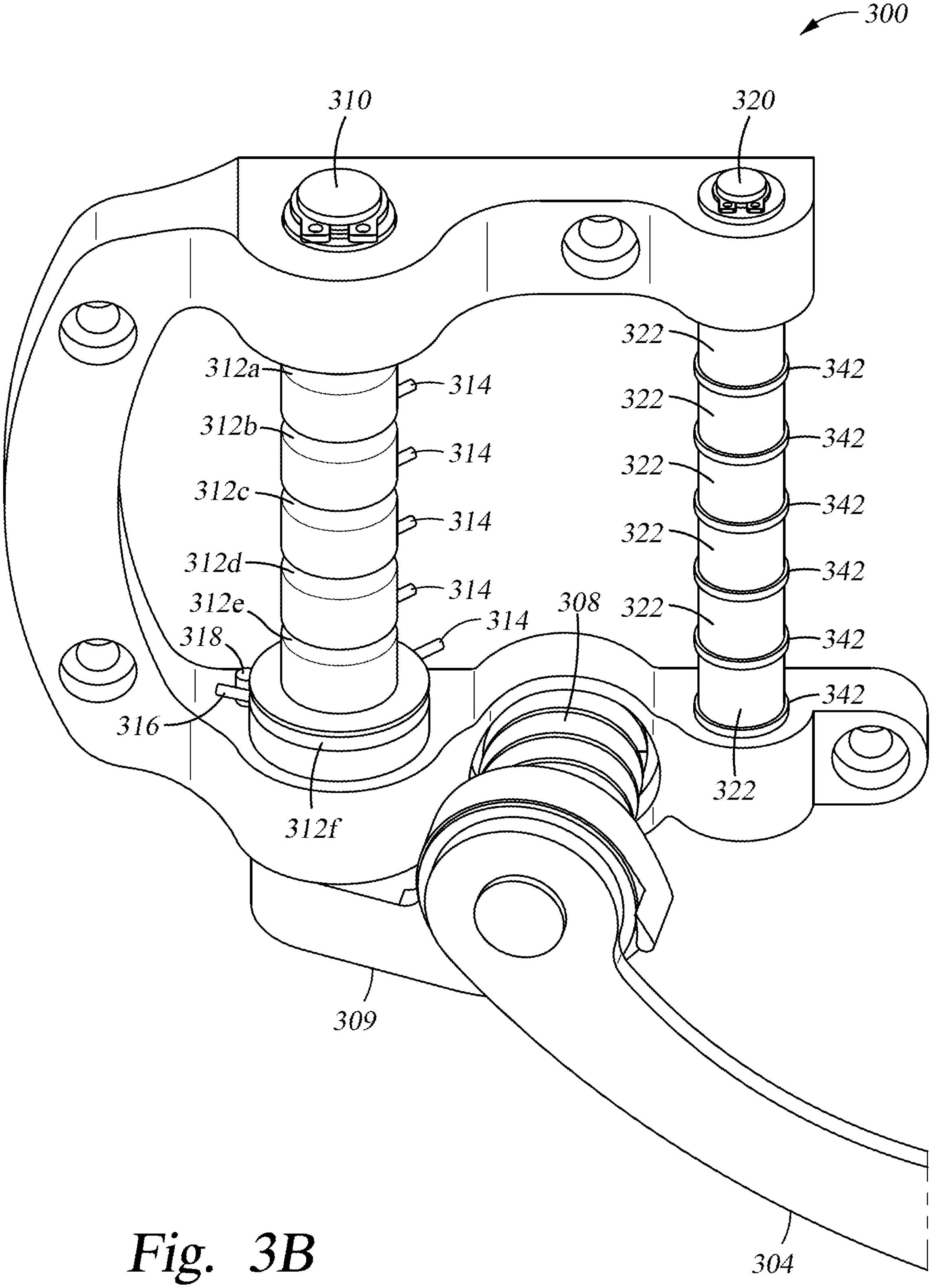
Figure 3C:
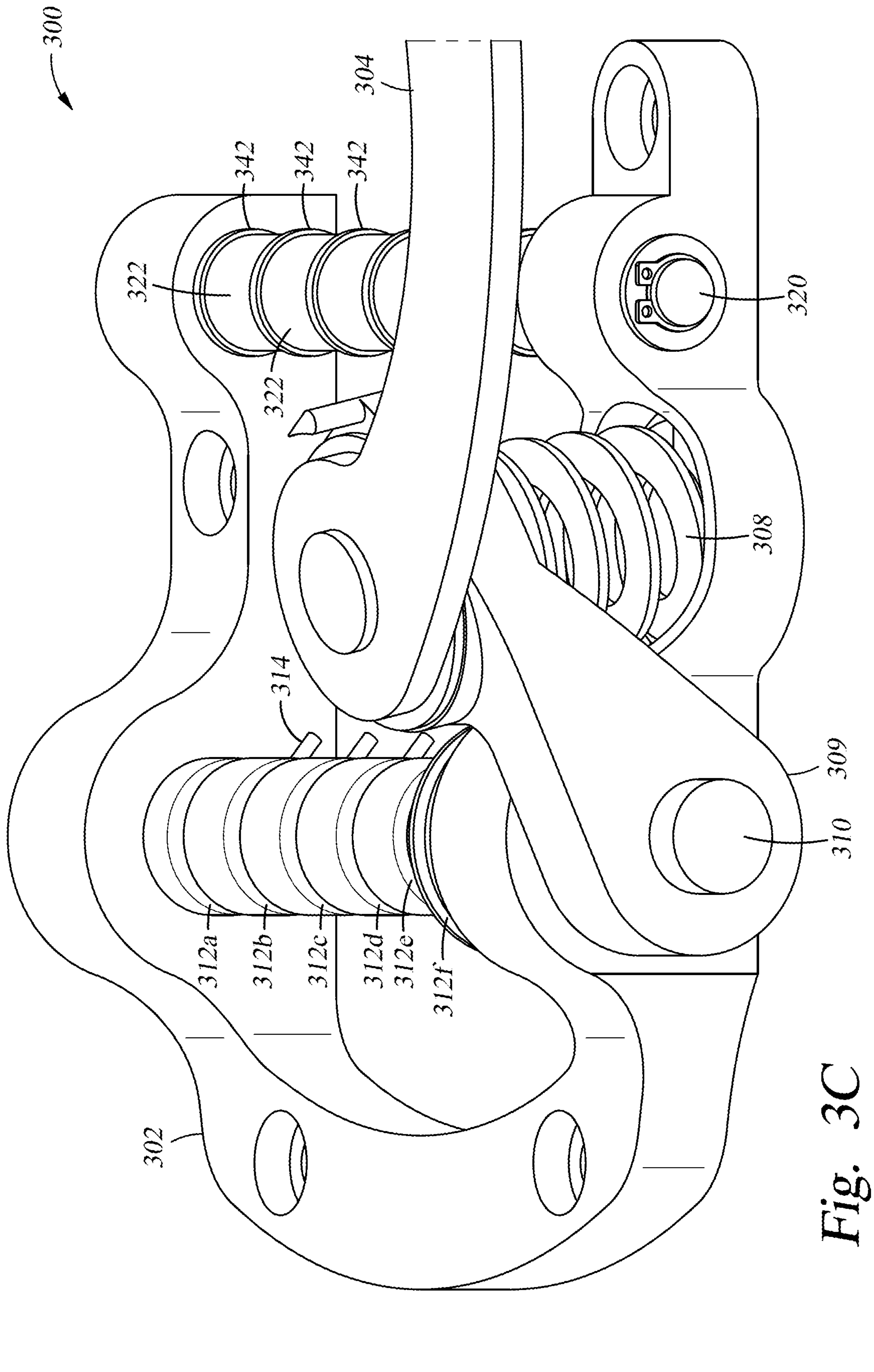

FIGS. 3A-3C depict different views of a vibrato mechanism 300 for a string instrument. Vibrato mechanism 300 is an alternative design to that depicted in FIGS. 1A-F. FIG. 3A is a top view, FIG. 3B is an isometric view, and FIG. 3C is a side view of vibrato mechanism 300.

As shown, vibrato mechanism 300 includes a base 302, which is configured to attach to a string instrument (e.g., to a top surface of the string instrument). In some embodiments, vibrato mechanism 300 may be attached to a string instrument via one or more screws.

Vibrato mechanism 300 includes an actuator arm 304 that is operatively connected to a bar 310 such that, when actuator arm 304 is engaged (e.g., pressed towards the instrument), bar 310 is caused to rotated about its longitudinal axis. Actuator arm 304 if connected to a spring 308 that extends between base 302 and a cup 309 beneath actuator arm 304 and causes actuator arm 304 to return to its resting position when it is released.

Bar 310 (which may be referred to as a string anchoring bar) comprises a plurality of segments $\mathbf{312}_{a-f}$ (which may be referred to collectively as segments 112 and individually as segment 112) of varying size. Segments 312 are similar to segments 112 of FIGS. 1A-F. In some embodiments, segments 312 may have differing shapes.

Segments 312 include protrusions 314 to which strings of a string instrument attach. For instance, as described in more detail below with respect to FIG. 2, a loop at an end of a given string may attach to a protrusion 314 of a given segment 312. Other techniques for attaching strings to segments 312 may also be employed.

Vibrato mechanism 100 comprises a stop mechanism that includes stop protrusions 316 and 318, which may function similarly to stop protrusions 116 and 118, described above with respect to FIGS. 1A-1I and below with respect to. In alternative embodiments, vibrato mechanism 300 may not include a stop mechanism.

Vibrato mechanism 300 further comprises an additional bar 320 (similar to bar 120 of FIGS. 1A-F), which may be referred to as a tension roller. As shown, bar 320 comprises a plurality of independently rotating components 322 separated and bounded by dividers 342. Components 322 may be separate cylindrical cams that rotate about a common underlying shaft. Dividers 342 may be made of a low-density material such as rubber or silicone, and may serve to isolate components 322 from one another and to prevent friction as components 322 rotate. In an example embodiment, the strings that are attached to segments 312 of bar 310 via protrusions 314 extend beneath bar 320 at a point between bar 310 and a neck of the string instrument, and components 322 contact the strings to increase string tension and optimize the break angles of the strings.

It is noted that some embodiments of vibrato mechanism 300 may not include a tension roller such as bar 320.

Figure 4A:
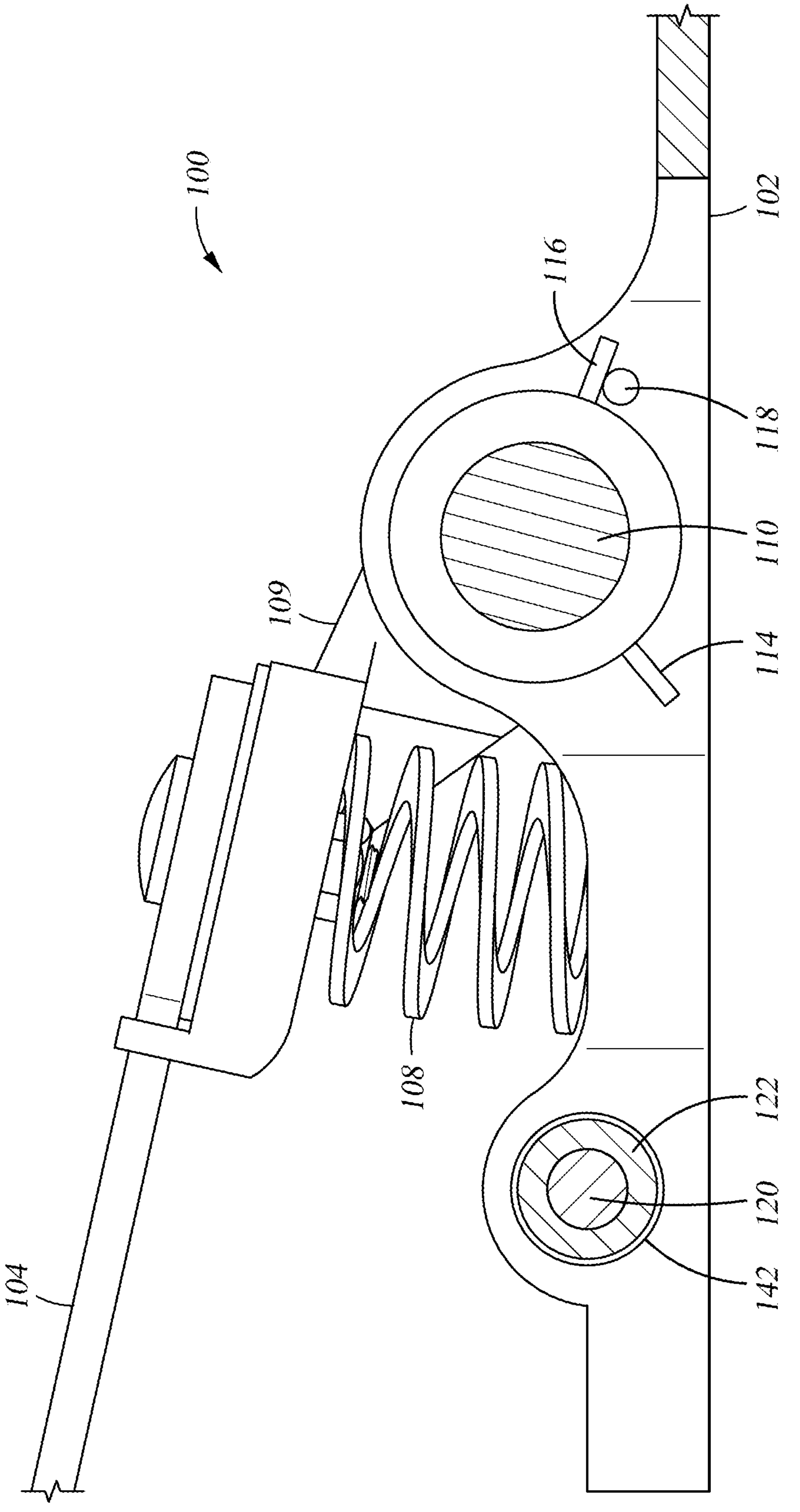
FIGS. 4A and 4B illustrate a stop mechanism of a vibrato mechanism according to embodiments of the present disclosure.
Figure 4B:
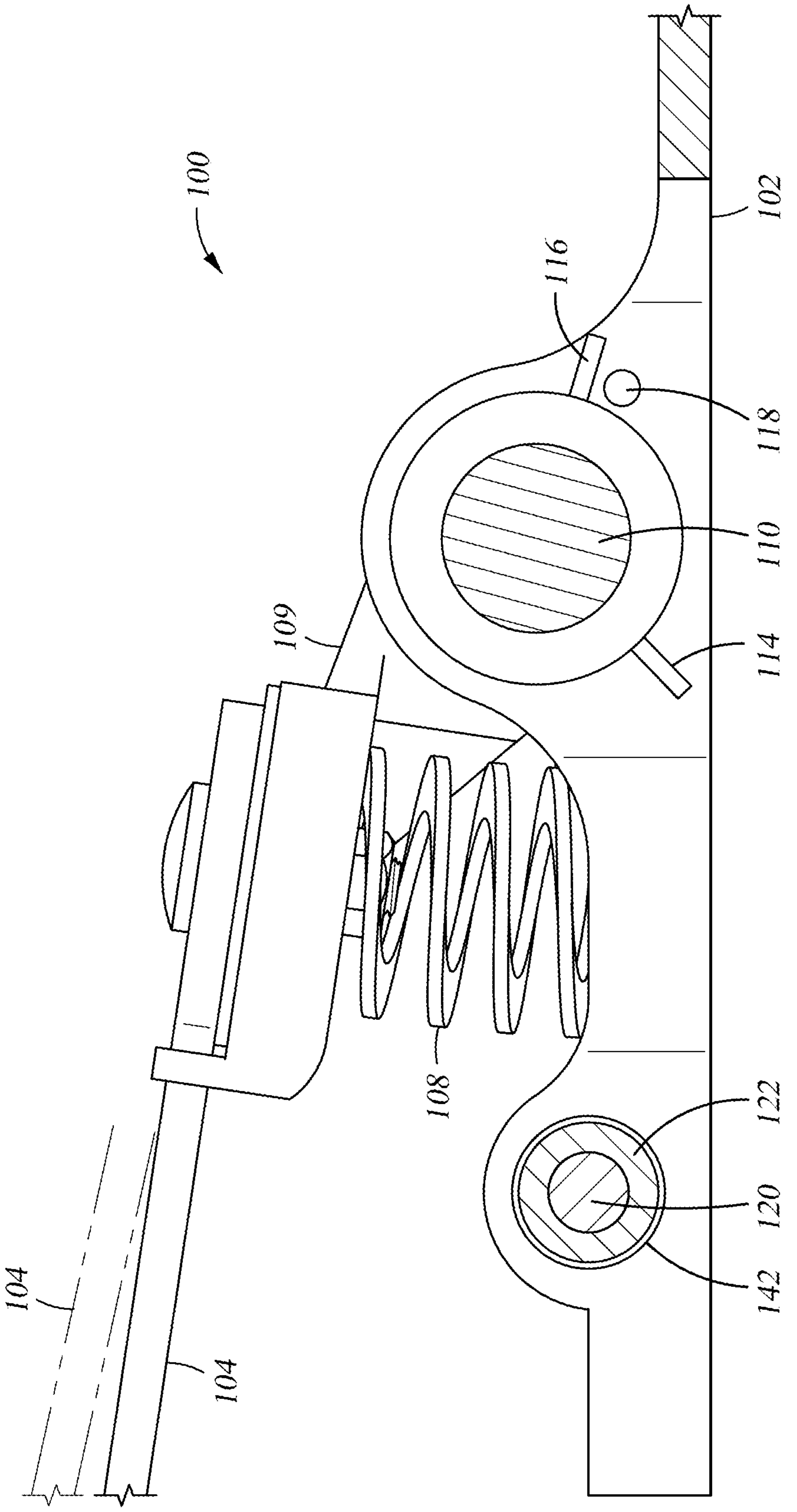

FIGS. 4A and 4B depict a stop mechanism for a vibrato mechanism according to embodiments of the present disclosure.

FIG. 4A comprises an illustration of the stop mechanism when actuator arm 104 and bar 110 of vibrato mechanism 100 are in their resting positions. It is noted that while the stop mechanism of FIGS. 4A and 4B is described with respect to vibrato mechanism 100 of FIGS. 1A-F, it may also be utilized with vibrato mechanism 300 of FIGS. 3A-C.

As shown, stop protrusion 116, attached to bar 110, and stop protrusion 118, attached to base 102, are in contact with one another. Contact between stop protrusions 116 and 118 prevents bar 110 from rotating about its longitudinal axis in a given direction (clockwise from the perspective of FIG. 4A). Thus, stop protrusions 116 and 118 prevent actuator arm 104 from being pulled away from the body of the instrument. Furthermore, stop protrusions 116 and 118 allow the pressure of spring 108 to be strong enough to overcome changes in string tension (e.g., due to a player bending a string) and prevent unintended rotation of bar 110 and resultant unintended string pitch change.

FIG. 4B comprises an illustration of the stop mechanism when actuator arm 104 is engaged (e.g., by pressing actuator arm 104 towards the top surface of the instrument).

As shown, stop protrusions 116 and 118 are no longer in contact with one another, as the rotation of bar 110 about its longitudinal axis (e.g., in a counter-clockwise direction from the perspective of FIG. 3B) has caused stop protrusion 116 to move away from stop protrusion 118. Thus, as depicted in FIG. 4B, stop mechanism allows actuator arm 104 to be engaged (e.g., towards the body of the instrument) and bar 110 to rotate in one direction while preventing bar 110 from rotating in the opposite direction.

It is noted that stop protrusions 116 and 118 are included as examples, and other types of stop protrusions may be used. For example, rather than being cylindrical pegs as shown, the stop protrusions may be formed in other shapes, such as flat, rectangular, or triangular protrusions. Furthermore, the stop protrusions may alternatively be located in different places on vibrato mechanism 100, For example, the stop protrusions may alternatively be located on the opposite end of bar 110 (e.g., opposite actuator arm 104 rather than being adjacent to actuator arm 104).

Figure 5:
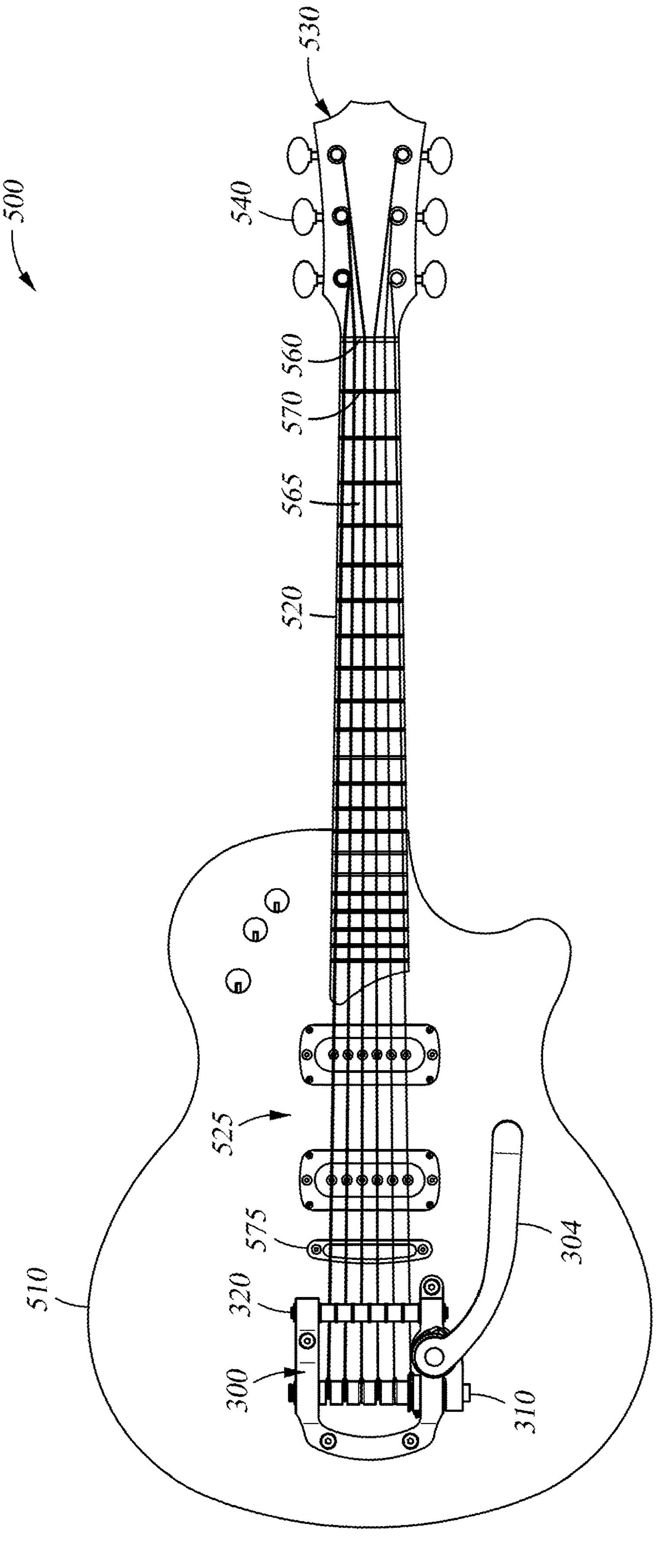
FIG. 5 illustrates a guitar configured with a vibrato mechanism according to embodiments of the present disclosure.

FIG. 5 illustrates a guitar 500 configured with a vibrato mechanism according to embodiments of the present disclosure. While guitar 500 is depicted with vibrato mechanism 300 of FIGS. 3A-C, guitar 500 may also be equipped with vibrato mechanism 100 of FIGS. 1A-F.

In the example of FIG. 5, the guitar 500 is an electric guitar. The guitar includes a body 510, a neck 520, and a headstock 530. Strings, including string 525, extend from the headstock where they are tightened to a preferred tension with keys 540 to vibrato mechanism 300, where they are anchored to segments 312 (shown in FIGS. 3A and 3B) of bar 310 via protrusions 314 (shown in FIGS. 3A and 3B), one protrusion 314 for each string. A nut 560 is placed at the end of a fingerboard 565 adjacent the headstock and controls the string spacing, distance from the edge of the fingerboard and the height of the strings above a first fret 570 on the fingerboard 565. The strings are slightly splayed over their length and extend over one or more saddles 575. The portion of the strings that vibrates to create a sound when plucked is that portion extending between the nut 560 and bar 320 and/or bar 310. The strings are stopped or effectively shortened when they are depressed behind a fret.

It is noted that, while certain embodiments are described with respect to guitars, techniques presented herein may also be employed with other types of string instruments. While the foregoing is directed to embodiments of the present disclosure, other and further embodiments of the disclosure may be devised without departing from the basic scope thereof, and the scope thereof is determined by the claims that follow.

The invention claimed is:

1. A vibrato mechanism, comprising:

a bar comprising a plurality of segments, wherein:

each respective segment of the plurality of segments is configured to connect to a respective string of a plurality of strings of a string instrument;

a first segment of the plurality of segments has a first size and is configured to connect to a first string of the plurality of strings having a first tension; and a second segment of the plurality of segments has a second size that is different than the first size and is configured to connect to a second string of the plurality of strings having a second tension that is different than the first tension; and an actuator arm that is operatively connected to the bar such that the actuator arm, when engaged, causes the bar to rotate about its longitudinal axis, wherein the bar comprises a first stop protrusion that is configured to contact a second stop protrusion attached to the vibrato mechanism when the actuator arm is not engaged, and wherein pressure from a spring presses the first stop protrusion and the second stop protrusion against one another when the actuator arm is not engaged.

2. The vibrato mechanism of claim 1, wherein, when the bar rotates about its longitudinal axis, the bar is configured to cause a first amount of linear string travel for the first string and a second amount of linear string travel for the second string, wherein the first amount of linear string travel and the second amount of linear string travel have a proportional relationship to the first size and the second size.

3. The vibrato mechanism of claim 1, wherein the plurality of segments comprise cylindrical segments with differing diameters or differing large axes.

4. The vibrato mechanism of claim 1, wherein the vibrato mechanism is configured to attach to a top surface of the string instrument.

5. The vibrato mechanism of claim 1, further comprising an additional bar configured to contact the plurality of strings at a point between the bar and a neck of the string instrument.

6. The vibrato mechanism of claim 5, wherein the additional bar comprises a plurality of independently rotating components, and wherein each respective independently rotating component of the independently rotating components is configured to contact a single respective string of the plurality of strings.

7. The vibrato mechanism of claim 1, wherein contact between the first stop protrusion and the second stop protrusion prevents the bar from rotating in a given direction about its longitudinal axis.

8. A vibrato mechanism, comprising:

a bar configured to connect to a plurality of strings of a string instrument;

an additional bar configured to contact the plurality of strings at a point between the bar and a neck of the string instrument, wherein the additional bar comprises a plurality of independently rotating components, and wherein each respective independently rotating component of the independently rotating components is configured to contact a single respective string of the plurality of strings; and an actuator arm that is operatively connected to the bar such that the actuator arm, when engaged, causes the bar to rotate about its longitudinal axis.

9. The vibrato mechanism of claim 8, wherein the bar comprises a plurality of segments;

each respective segment of the plurality of segments is configured to connect to a respective string of the plurality of strings;

a first segment of the plurality of segments has a first size and is configured to connect to a first string of the plurality of strings having a first tension; and a second segment of the plurality of segments has a second size that is different than the first size and is configured to connect to a second string of the plurality of strings having a second tension that is different than the first tension.

10. A guitar, comprising:

a neck;

a body;

a top; and a vibrato mechanism affixed to the top, wherein the vibrato mechanism comprises:

a bar comprising a plurality of segments, wherein:

each respective segment of the plurality of segments is configured to connect to a respective string of a plurality of strings of the guitar;

a first segment of the plurality of segments has a first size and is configured to connect to a first string of the plurality of strings having a first tension; and a second segment of the plurality of segments has a second size that is different than the first size and is configured to connect to a second string of the plurality of strings having a second tension that is different than the first tension; and an actuator arm that is operatively connected to the bar such that the actuator arm, when engaged, causes the bar to rotate about its longitudinal axis, wherein the bar comprises a first stop protrusion that is configured to contact a second stop protrusion attached to the vibrato mechanism when the actuator arm is not engaged, and wherein pressure from a spring presses the first stop protrusion and the second stop protrusion against one another when the actuator arm is not engaged.

11. The guitar of claim 10, wherein, when the bar rotates about its longitudinal axis, the bar is configured to cause a first amount of linear string travel for the first string and a second amount of linear string travel for the second string, wherein the first amount of linear string travel and the second amount of linear string travel have a proportional relationship to the first size and the second size.

12. The guitar of claim 10, wherein the plurality of segments comprise cylindrical segments with differing diameters or differing large axes.

13. The guitar of claim 10, further comprising an additional bar configured to contact the plurality of strings at a point between the bar and the neck of the guitar.

14. The guitar of claim 13, wherein the additional bar comprises a plurality of independently rotating components, and wherein each respective independently rotating component of the independently rotating components is configured to contact a single respective string of the plurality of strings.

15. The guitar of claim 10, wherein contact between the first stop protrusion and the second stop protrusion prevents the bar from rotating in a given direction about its longitudinal axis.

16. A vibrato mechanism, comprising:

a bar comprising a plurality of segments, wherein:

each respective segment of the plurality of segments is configured to connect to a respective string of a plurality of strings of a string instrument;

a first segment of the plurality of segments has a first size and is configured to connect to a first string of the plurality of strings having a first tension; and a second segment of the plurality of segments has a second size that is different than the first size and is configured to connect to a second string of the plurality of strings having a second tension that is different than the first tension;

an additional bar configured to contact the plurality of strings at a point between the bar and a neck of the string instrument, wherein the additional bar comprises a plurality of independently rotating components, and wherein each respective independently rotating component of the independently rotating components is configured to contact a single respective string of the plurality of strings; and an actuator arm that is operatively connected to the bar such that the actuator arm, when engaged, causes the bar to rotate about its longitudinal axis.

17. A guitar, comprising:

a neck;

a body;

a top; and a vibrato mechanism affixed to the top, wherein the vibrato mechanism comprises:

a bar comprising a plurality of segments, wherein:

each respective segment of the plurality of segments is configured to connect to a respective string of a plurality of strings of the guitar;

a first segment of the plurality of segments has a first size and is configured to connect to a first string of the plurality of strings having a first tension; and a second segment of the plurality of segments has a second size that is different than the first size and is configured to connect to a second string of the plurality of strings having a second tension that is different than the first tension;

an additional bar configured to contact the plurality of strings at a point between the bar and the neck of the guitar, wherein the additional bar comprises a plurality of independently rotating components, and wherein each respective independently rotating component of the independently rotating components is configured to contact a single respective string of the plurality of strings; and an actuator arm that is operatively connected to the bar such that the actuator arm, when engaged, causes the bar to rotate about its longitudinal axis.

18. The vibrato mechanism of claim 1, wherein each respective segment of the plurality of segments is configured to connect to the respective string of the plurality of strings via a respective protrusion attached to the respective segment.

19. The vibrato mechanism of claim 16, wherein each respective segment of the plurality of segments is configured to connect to the respective string of the plurality of strings via a respective protrusion attached to the respective segment.

* * * * *